(12) United States Patent
Klieman et al.

(10) Patent No.: US 7,899,750 B1
(45) Date of Patent: Mar. 1, 2011

(54) GOAL ORIENTATED COMPUTING SYSTEM IMPLEMENTED FINANCIAL MANAGEMENT USING PROJECTED BALANCES

(75) Inventors: Michael S. Klieman, Belmont, CA (US); Tara Feldmeier, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 11/554,823

(22) Filed: Oct. 31, 2006

(51) Int. Cl.
*G06Q 40/00* (2006.01)
(52) U.S. Cl. .......................................... 705/40; 705/35
(58) Field of Classification Search ................ 705/40
See application file for complete search history.

(56) References Cited

U.S. PATENT DOCUMENTS

| | | | |
|---|---|---|---|
| 6,839,687 B1 * | 1/2005 | Dent et al. ...................... | 705/40 |
| 2002/0111886 A1 * | 8/2002 | Chenevich et al. ............ | 705/30 |
| 2002/0174006 A1 * | 11/2002 | Rugge et al. ................... | 705/10 |
| 2005/0177502 A1 * | 8/2005 | Thomas .......................... | 705/40 |

\* cited by examiner

*Primary Examiner* — Hani Kazimi
*Assistant Examiner* — Clifford Madamba
(74) *Attorney, Agent, or Firm* — Gunnison, McKay & Hodgson, L.L.P.; Philip McKay

(57) ABSTRACT

A method and apparatus for goal orientated computing system implemented financial management using projected balances includes a process for goal orientated financial management using projected balances whereby a user defines financial goals and then automatic payment rules based on projected account balance data are created to help accomplish those goals.

43 Claims, 8 Drawing Sheets

330

331

341

Your projected balance data indicates
that during this pay period if you
pay only the minimum credit card
payments due you will
have a surplus of uncommitted funds in
your account in the amount of $1000.00.

Your defined financial goal of
depositing at least $12,000.00 a year
into your child's college savings account
leads to the recommendation
that this pay period you pay only the
minimum credit card payments due and then
deposit $1000.00 into your child's
college saving account

**Please Indicate Receipt of this
Notification by Clicking on the
"RECIEVED" Box Provided Below**

343 ☐ RECIEVED

In light of your chosen financial goal to maintain a balance of at least $3000.00 in your checking account #1. Your car payment of $500.00 has been scheduled to be made on the 16$^{th}$ of this month, after your 15$^{th}$ of the month paycheck has been deposited.

Please Indicate Receipt of this Notification by Clicking on the "RECIEVED" Box Provided Below

443 ☐ RECIEVED

Your projected balance    541
data indicates that during this pay
period if you pay only the minimum
credit card payments due you will
have a surplus of uncommitted funds
in your account in the amount of
$1000.00.

Your defined goal of minimizing
interest paid would dictate that you
pay only the minimum credit card
payments due and pay $1000.00 to high
interest credit account #1.

However, you have indicated that any
payment over $500.00 requires your
approval.

**DO YOU WISH TO MAKE THE $1000.00 PAYMNET
TO CREDIT ACCOUNT #1 IN ACCORDANCE WITH
YOUR STATED FINANCAIL GOAL?**

543A ☐    TAKE ACTION

543B ☐    DO NOT TAKE ACTION

GOAL ORIENTATED COMPUTING SYSTEM IMPLEMENTED FINANCIAL MANAGEMENT USING PROJECTED BALANCES

CROSS REFERENCE TO RELATED APPLICATIONS

The present invention is related to U.S. patent application Ser. No. 11/262,305 entitled "ONLINE BILL PAYMENT MANAGEMENT AND PROJECTED ACCOUNT BALANCES", filed Oct. 28, 2005 in the name of the inventors: Deepa Bachu; Tara Feldmeier; Craig LaSalle; Suzanne Y. Pellican; Steven A. Sholtis; Wendy Spies; and Jeffery P. Zimmerman, and assigned to the assignee of the present invention, the disclosure of which is incorporated herein, in its entirety and for all purposes, by reference.

BACKGROUND

For many consumers computing system implemented software and/or web-based financial management systems have become the mechanism of choice to monitor the consumer's financial activity including, checking various account balances, implementing budgets, and paying bills. Examples of web-based financial management systems include any of the web-based banking sites available on the Internet and that are now offered by virtually every major bank in the country. Using web-based banking sites, the account holder can perform a plethora of tasks including, balance monitoring, bill payment, balance transfers, etc., all from any traditional or mobile computing system/device and/or network access tool/device.

Examples of computing system implemented financial management software systems include any of the currently available computing system implemented personal and small business financial management software systems. Current computing system implemented personal and small business financial management software systems are typically software applications which, along with a parent computing system or device, provide a user with a centralized interface with banks, and other various financial institutions, for electronically tracking financial transactions to allow a user to, for example, balance checkbooks, pay bills, track expenditures, create and manage budgets and transfer money between accounts. Computing system implemented financial management software systems have enjoyed increased popularity as their capability has increased and the complexity of the average household's, or small business's, finances have also increased.

Herein, computing system implemented financial management software systems and web-based, networked, and/or Internet-based, financial management systems are referred to collectively as computing system implemented financial management systems.

Currently, several computing system implemented financial management systems include automatic payment and/or bill presentment features that provide a user with the ability to schedule bill payments from selected checking, savings, or other asset-based and/or credit-based accounts using automatic payment guidelines or "rules" established by the user and/or the provider of the automatic payment and/or bill presentment feature. Currently, these automatic payment rules typically include: automatic payment of a recurring bill to the same payee, for the same amount, on a periodic basis; automatic payment of a recurring bill to the same payee, for a variable amount, up to a predefined limit, on a periodic basis; automatic payment of a recurring bill to the same payee, in the amount of a minimum balance due, on a periodic basis; and automatic payment of a recurring bill to the same payee, for a variable amount, to be paid in full on a periodic basis.

Current computing system implemented financial management system automatic payment and/or bill presentment features have, without question, provided a valuable capability to both users and financial institutions. In addition, automatic payment and/or bill presentment features have proven a favorite feature of financial institution customers. However, as discussed above, current computing system implemented financial management systems use automatic payment and/or bill presentment features with automatic payment rules that are typically strictly directed to the automated payment of specific payees and/or bills, and are centered on the single goal of making the automatic payment, without regard for any other financial goals or needs of the user. Consequently, current automatic payment and/or bill presentment features offer the user little or no help with the actual budgeting and planning process.

Recently, computing system implemented financial management systems have been introduced which include a projected balance feature. A projected balance feature calculates and estimates a projected balance of a selected account, such as a checking or savings account, at any designated future date or time frame, such as a particular day, week or month. Typically the projected balance is calculated using historical data about the account such as: current balance in the account; recurring deposits to the account, such as a weekly, biweekly, or monthly paycheck, or any other type of deposit made into the selected account on a recurring periodic basis; recurring withdraws, outflows, and bill payments made out of the account on a recurring periodic basis; pending activity, such as written but un-cashed checks; and/or any other recurring and/or user designated activity involving the selected account. The emergence of the projected balance feature in computing system implemented financial management systems provides users with potentially powerful budgeting capabilities that were previously unavailable.

SUMMARY

In accordance with one embodiment, a method and apparatus for goal orientated computing system implemented financial management using projected balances includes a process for goal orientated financial management using projected balances whereby a user defines financial goals and then automatic payment rules based on projected account balance data are developed to accomplish those goals.

Herein, the term "automatic payment", as used independently and/or as used in the phrases such as "automatic payment rules", applies to payments, transfers, deposits or any other form of transaction that involves the movement of funds within an account, between accounts, into an account, or from an account.

In one embodiment, a computing system implemented financial management system including a projected balance feature is provided. In one embodiment, the projected balance feature is used to predict future balances of a selected account, such as a checking or savings account, over the course of a predefined period of time using historical data about the account such as: recurring deposits to the account, such as a weekly, biweekly, or monthly paycheck, or any other type of recurring deposit into the selected account; recurring withdraws, outflows, and bill payments made out of the account; pending activity, such as written but un-cashed checks; and/or any other recurring and/or user designated activity involving the selected account. In one embodiment, the projected balance information is eventually used to formulate automatic payment rules.

In one embodiment, a user then defines one or more financial goals. The specific financial goals defined will vary from user-to-user, however, examples of user defined goals include, but are not limited to: balance related goals, such as the goal of maintaining a minimum account balance, maximizing an average account balance over a defined period, minimizing an average account balance over a defined period, leveling out cash flow over a defined period, or any other balance related financial goal defined by the user; bill payment prioritization related goals such as prioritization of bill payments so that bills of core importance, or highest interest rate, are paid off first, and/or any projected surpluses are directed to these accounts, or any other payment prioritization desired by the user; savings related goals, such as giving a savings program priority over paying off entire credit account balances, or giving one saving program priority over another savings program and directing any projected account surpluses to the priority savings account first, or any other savings related goal desired by the user; and any other short, medium, or long term financial goal as determined and/or defined by a user of the process for goal orientated financial management using projected balances.

In one embodiment, once the user financial goals are defined, the projected balance data for the account is then used to create automatic payment rules that help the user meet his or her defined financial goals within the framework of the user's projected balance.

In one embodiment, financial transactions are then enacted, or action suggested, based on the automatic payment rules and the level of automation defined by the user. For instance, in some, highly automated, embodiments, once the automatic payment rules are created, the process for goal orientated financial management using projected balances takes over the majority of bill payment, account transfer, and savings, activity automatically, only notifying a user of the action after it is taken. In other, largely manual, embodiments, once the automatic payment rules are created, each potential action is merely recommended by the process for goal orientated financial management using projected balances. The recommended action is then brought to the user's attention via a notification or alert, but, in this embodiment, the action itself must be approved and/or manually undertaken by the user. In other embodiments, the level of automation is anywhere between these two extremes, with either specific actions being designated manual or automatic and/or specific time frames being designated manual or automatic and/or transaction specific parameters, such as amount of money being transacted, determining if a specific transaction is automated or manual.

Using the method and apparatus for goal orientated financial management using projected balances disclosed herein, the power of projected balance features now offered in some computing system implemented financial management systems is harnessed to provide a user of the method and apparatus for goal orientated financial management using projected balances with the ability to define financial goals and create specific automated payment rules consistent with those goals, and the user's projected account balance. Consequently, automatic payment rules can be created for making required payments in amounts, and at times, that are most consistent with the user's larger goals. Therefore, a computing system implemented financial management system incorporating the method and apparatus for goal orientated financial management using projected balances disclosed herein becomes more of a virtual financial planning partner for the user, as opposed to a rather myopic and simplistic electronic checkbook and calendar function.

In addition, as discussed in more detail below, using the below embodiments, with little or no modification and/or input, there is considerable flexibility, adaptability, and opportunity for customization to meet the specific needs of various users under numerous circumstances.

BRIEF DESCRIPTION OF THE DRAWINGS

FIG. 3B is a representation of a recommended action display in accordance with one embodiment of the invention;

FIG. 4B is a representation of an notification display in accordance with one embodiment of the invention;

FIG. 5B is a representation of an alert/approval request display in accordance with one embodiment of the invention.

Figure 1:
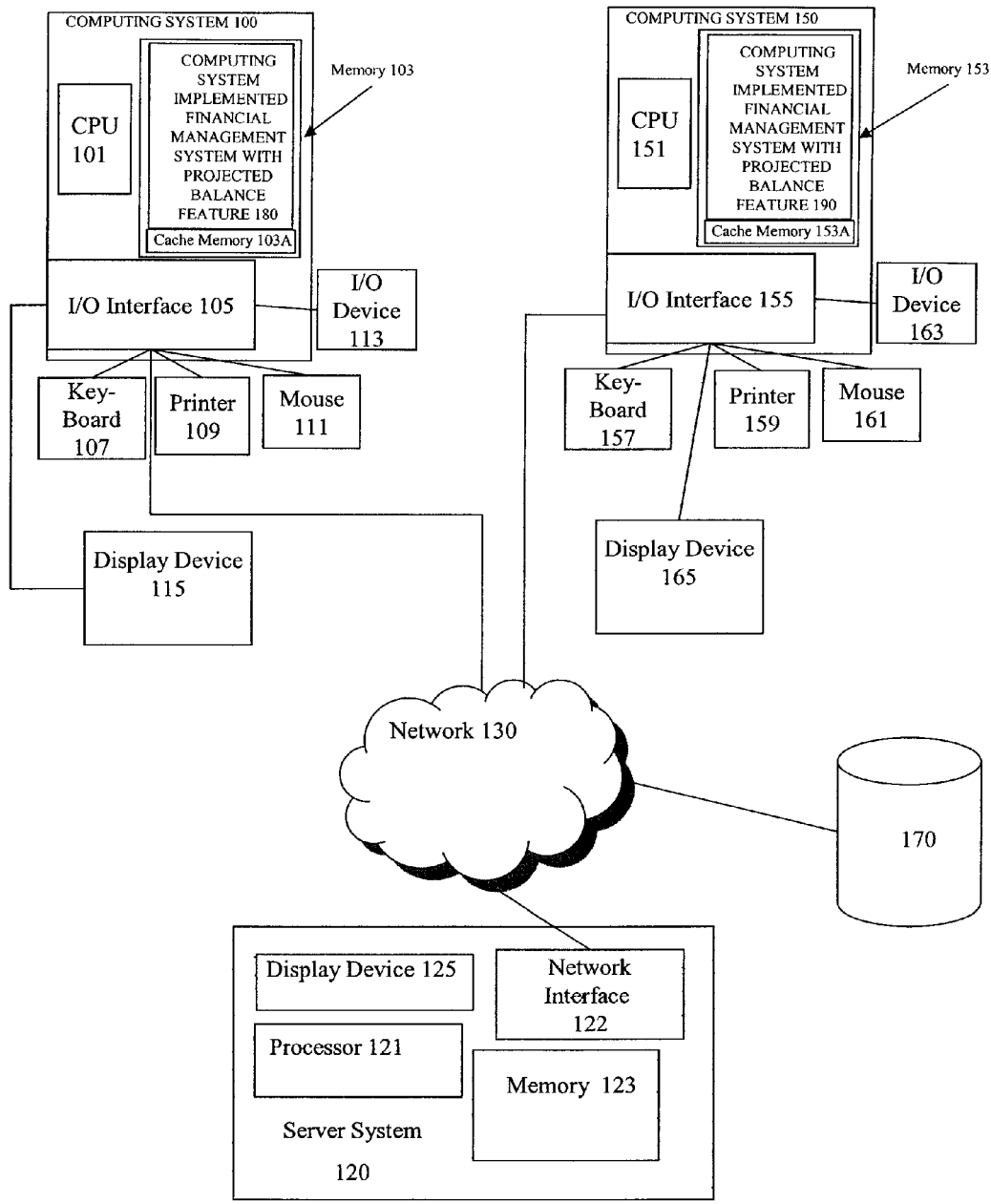
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments, including the particular order of events shown in the FIG.s and discussed below, are provided to allow a complete disclosure that conveys the principles of the invention, as set forth in the claims, to those of skill in the art.

In addition, the particular screen layouts, appearance, and terminology as depicted and described herein, are intended to be illustrative and exemplary only, and in no way limit the scope as claimed below. In particular, screenshots and user interface elements shown in the FIG.s are exemplary; other layouts, arrangements, formats, and user interface features may be provided without departing from the characteristics of the invention as claimed.

As used herein, the term computing system implemented financial management system includes: web-based, network, or Internet-based, financial management systems offered by financial institutions, such as banks and credit unions, financial management services, and/or any third parties, whether known or available at the time of filing or as developed thereafter; and non-web-based computing system implemented financial management systems such as computing system implemented financial management software systems, applications, modules and/or functionality. In some embodiments, the computing system implemented financial management systems and/or the process for goal orientated financial management using projected balances are used directly by a user of the process for goal orientated financial management using projected balances and the owner of the accounts/assets. In other embodiments, the computing system implemented financial management systems and/or the process for goal orientated financial management using projected balances are used on behalf of the owner of the accounts/assets by a third party user.

As used herein, the term financial management system includes, but is not limited to: banking related financial management systems, programs, modules, web-based systems, or applications; business financial management systems, packages, programs, modules, web-based systems, or applications; personal and/or small business financial management systems, packages, programs, modules, web-based systems, or applications; tax preparation systems, packages, programs, modules, web-based systems, or applications; accounting and/or invoicing systems, packages, programs, modules, web-based systems, or applications; and various other electronic transaction driven data management systems, packages, programs, modules, web-based systems, or applications, whether available or known at the time of filing or as developed later.

Herein, the term "automatic payment", as used independently and/or as used in the phrases such as "automatic payment rules", applies to payments, transfers, deposits or any other form of transaction that involves the movement of funds within an account, between accounts, into an account, or from an account.

In accordance with one embodiment, a method and apparatus for goal orientated computing system implemented financial management using projected balances includes a process for goal orientated financial management using projected balances (200 in FIG. 2, 300 in FIG. 3A, 400 In FIGS. 4A and 500 in FIG. 5A) whereby a user defines financial goals and then automatic payment rules based on projected account balance data are developed to accomplish those goals.

In one embodiment, a computing system implemented financial management system including a projected balance feature is provided. In one embodiment, the projected balance feature is used to predict future balances of a selected account, such as a checking or savings account, over the course of a predefined period of time using historical data about the account such as: recurring deposits to the account, such as a weekly, biweekly, or monthly paycheck, or any other type of recurring deposit into the selected account; recurring withdraws, outflows, and bill payments made out of the account; pending activity, such as written but un-cashed checks; and/or any other recurring and/or user designated activity involving the selected account. In one embodiment, the projected balance information is eventually used to formulate automatic payment rules.

In one embodiment, a user defines one or more financial goals. The specific financial goals defined will vary from user-to-user, however, examples of user defined goals include, but are not limited to: balance related goals, such as the goal of maintaining a minimum account balance, maximizing an average account balance over a defined period, minimizing an average account balance over a defined period, leveling out cash flow over a defined period, or any other balance related financial goal defined by the user; bill payment prioritization related goals such as prioritization of bill payments so that bills of core importance, or highest interest rate, are paid off first, and/or any projected surpluses are directed to these accounts, or any other payment prioritization desired by the user; savings related goals, such as giving a savings program priority over paying off entire credit account balances, or giving one saving program priority over another savings program and directing any projected account surpluses to the priority savings account first, or any other savings related goal desired by the user; and any other short, medium, or long term financial goal as determined and/or defined by a user of the process for goal orientated financial management using projected balances.

In one embodiment, once the user financial goals are defined, the projected balance data for the account is then used to create automatic payment rules that help the user meet his or her defined financial goals within the framework of the user's projected balance.

In one embodiment, financial transactions are then enacted, or action suggested, based on the automatic payment rules and the level of automation defined by the user. For instance, in some, highly automated, embodiments, once the automatic payment rules are created, the process for goal orientated financial management using projected balances takes over the majority of bill payment, account transfer, and savings, activity automatically, only notifying a user of the action after it is taken. In other, largely manual, embodiments, once the automatic payment rules are created, each potential action is merely recommended by the process for goal orientated financial management using projected balances. The recommended action and is then brought to the user's attention via a notification or alert, but, in this embodiment, the action itself must be approved and/or manually undertaken by the user. In other embodiments, the level of automation is anywhere between these two extremes, with either specific actions being designated manual or automatic and/or specific time frames being designated manual or automatic and/or transaction specific parameters, such as amount of money being transacted, determining if a specific transaction is automated or manual.

Using the method and apparatus for goal orientated financial management using projected balances disclosed herein, the power of projected balance features now offered in some computing system implemented financial management systems is harnessed to provide a user of the method and apparatus for goal orientated financial management using projected balances with the ability to define financial goals and create specific automated payment rules consistent with those goals, and the user's projected account balance. Consequently, automatic payment rules can be created for making required payments in amounts, and at times, that are most consistent with the user's larger goals. Therefore, a computing system implemented financial management system incorporating the method and apparatus for goal orientated financial management using projected balances disclosed herein becomes more of a virtual financial planning partner for the user, as opposed to a rather myopic and simplistic electronic checkbook and calendar function.

Various specific details are discussed below, and shown in the accompanying FIG.s, to aid one of skill in the art in understanding the invention. However, such specific details are intended to be illustrative only, and are not intended to restrict in any way the scope as claimed below. In addition, the particular terminology used herein is intended to be illustrative and exemplary only, and in no way limits the scope as claimed.

Some embodiments are implemented in, or with, a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via a network, such as a Local Area Network (LAN), Wide Area Network (WAN), a public network, such as the Internet, a private network, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the method and apparatus for goal orientated financial management using projected balances described herein makes use of input provided to the computing system/device implementing a process for goal orientated financial management using projected balances, discussed herein, via user interface devices such as a keyboard, mouse, touchpad, or any other device capable of providing user input to a computing system or for translating user actions into computing system operations, whether available at the time of filing or as developed later.

Hardware System Architecture

FIG. 1 is a block diagram of an exemplary hardware architecture for implementing one embodiment of a process for goal orientated financial management using projected balances, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management system with projected balance feature 180 stored, in whole, or in part, therein, that is a parent system for, is used by, or includes, as discussed below, a process for goal orientated financial management using projected balances, such as processes 200, 300, 400, and 500 discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process for goal orientated financial management using projected balances, such as processes 200, 300, 400, and 500, and a computing system implemented financial management system with projected balance feature 180, can be loaded, in whole, or in part, into computing system 100 via I/O device 113, such as from a CD, DVD or floppy disk containing all, or part, of computing system implemented financial management system with projected balance feature 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management system with projected balance feature 190 stored, in whole, or in part, therein, that is a parent system for, is used by, or includes, as discussed below, a process for goal orientated financial management using projected balances, such as processes 200, 300, 400, and 500.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process for goal orientated financial management using projected balances, such as processes 200, 300, 400, and 500, and a computing system implemented financial management system with projected balance feature 190, can be loaded, in whole, or in part, into computing system 150 via I/O device 163, such as from a CD, DVD or floppy disk containing all, or part, of computing system implemented financial management system with projected balance feature 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process for goal orientated financial management using projected balances, such as processes 200, 300, 400, and 500, and/or computing system implemented financial management system with projected balance feature 180 and/or computing system implemented financial management system with projected balance feature 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for goal orientated financial management using projected balances, such as processes 200, 300, 400, and 500, and a computing system implemented financial management system with projected balance feature 180 and/or computing system implemented financial management system with projected balance feature 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for goal orientated financial management using projected balances, such as processes 200, 300, 400, and 500, and a computing system implemented financial management system with projected balance feature 180 and/or computing system implemented financial management system with projected balance feature 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for goal orientated financial management using projected balances, such as processes 200, 300, 400, and 500, and a computing system implemented financial management system with projected balance feature, such as computing system implemented financial management system with projected balance feature 180 and/or 190, are sometimes referred to herein, alternatively, as a process, an application, a module, a program, a component of a software system, a component of a software package, a component of a parent system, or a feature of a parent system, this terminology is illustrative only. In some embodiments, a process for goal orientated financial management using projected balances, such as processes 200, 300, 400, and 500, and a computing system implemented financial management system with projected balance feature, such as computing system implemented financial management system with projected balance feature 180 and/or 190, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process for goal orientated financial management using projected balances, such as processes 200, 300, 400, and 500, and a computing system implemented financial management system with projected balance feature, such as computing system implemented financial management system with projected balance feature 180 and/or 190, discussed herein, by processor 101, processor 151, or server system processor 121, results in the operations of an agent computer process (not shown) and/or a rule computer process (not shown).

In one embodiment, a process for goal orientated financial management using projected balances, such as processes 200, 300, 400, and 500, and a computing system implemented financial management system with projected balance feature, such as computing system implemented financial management system with projected balance feature 180 and/or 190, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process for goal orientated financial management using projected balances, such as processes 200, 300, 400, and 500, and a computing system implemented financial management system with projected balance feature, such as computing system implemented financial management system with projected balance feature 180 and/or 190, discussed herein, may be stored in a memory that is physically located in a location, such as server system memory 123, or database 170, of FIG. 1, different from a computing system, such as computing systems 100 and/or 150 of FIG. 1, utilizing a process for goal orientated financial management using projected balances, such as processes 200, 300, 400, and 500, and a computing system implemented financial management system with projected balance feature, such as computing system implemented financial management system with projected balance feature 180 and/or 190.

In one embodiment, all, or part, of a process for goal orientated financial management using projected balances, such as processes 200, 300, 400, and 500, and a computing system implemented financial management system with projected balance feature, such as computing system implemented financial management system with projected balance feature 180 and/or 190, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for goal orientated financial management using projected balances, such as processes 200, 300, 400, and 500, and a computing system implemented financial management system with projected balance feature, such as computing system implemented financial management system with projected balance feature 180 and/or 190, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process for goal orientated financial management using projected balances, such as processes 200, 300, 400, and 500, and a computing system implemented financial management system with projected balance feature, such as computing system implemented financial management system with projected balance feature 180 and/or 190, discussed herein, in accordance with at least one of the embodiments as described herein. Similarly, in another embodiment, a process for goal orientated financial management using projected balances, such as processes 200, 300, 400, and 500, and a computing system implemented financial management system with projected balance feature, such as computing system implemented financial management system with projected balance feature 180 and/or 190, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In accordance with one embodiment of a process for goal orientated financial management using projected balances, a user defines financial goals and then automatic payment rules based on projected account balance data are developed to accomplish those goals.

Figure 2:
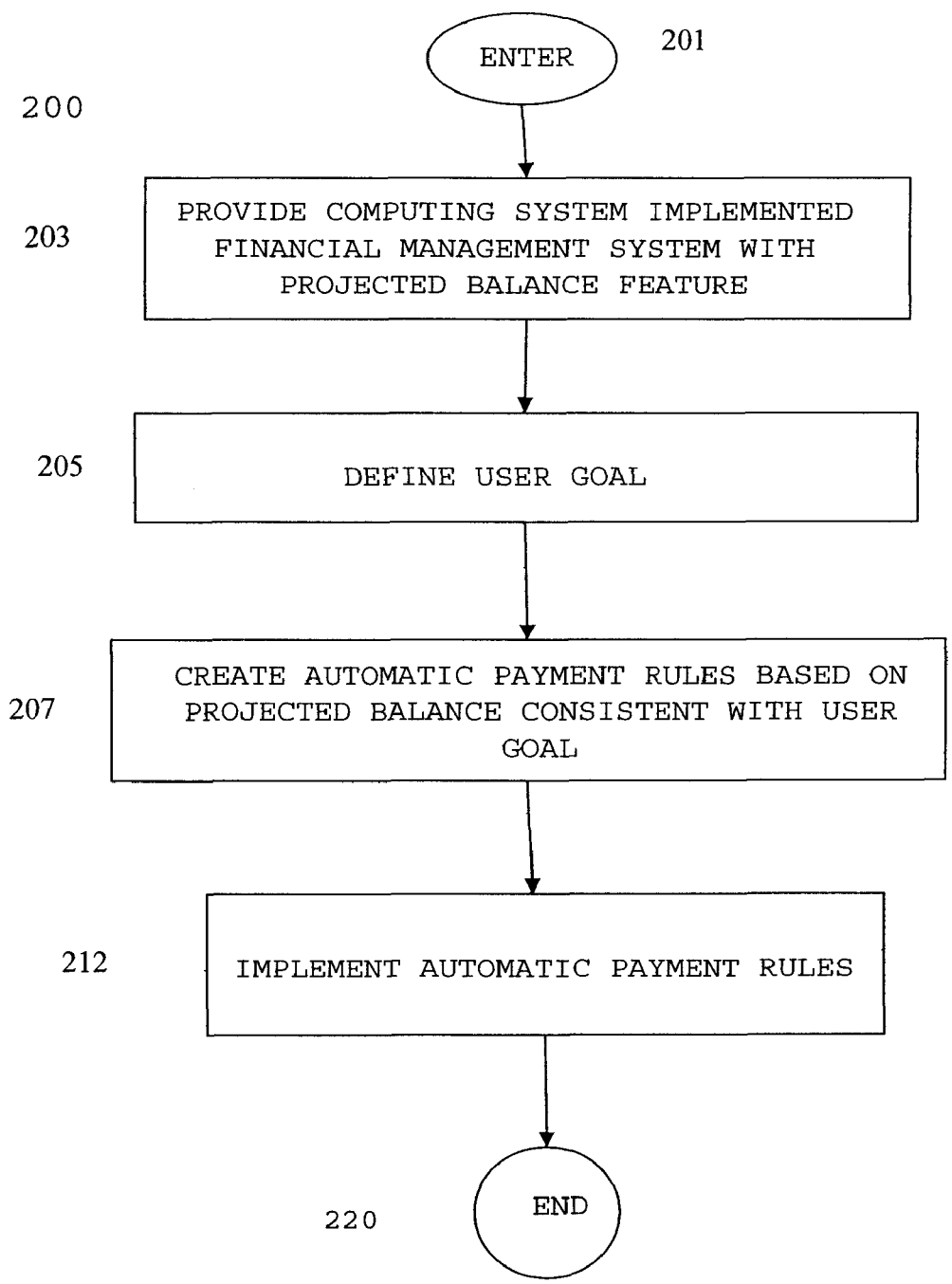
FIG. 2 is a flow chart depicting a process for goal orientated financial management using projected balances in accordance with one embodiment.

FIG. 2 is a flow chart depicting a process for goal orientated financial management using projected balances 200 in accordance with one embodiment. Process for goal orientated financial management using projected balances 200 begins at ENTER OPERATION 201 and process flow proceeds to PROVIDE COMPUTING SYSTEM IMPLEMENTED FINANCIAL MANAGEMENT SYSTEM WITH PROJECTED BALANCE FEATURE OPERATION 203.

In one embodiment, at PROVIDE COMPUTING SYSTEM IMPLEMENTED FINANCIAL MANAGEMENT SYSTEM WITH PROJECTED BALANCE FEATURE OPERATION 203 a computing system implemented financial management system is provided to a user by: a financial institution, such as a bank, credit union, savings and loan, or any business offering financial asset and/or credit-based accounts; a provider of a computing system implemented financial management system application, program, module, or interface; a web-based service; or any party and/or mechanism for providing a computing system implemented financial management system, whether known and/or available at the time of filing or as developed thereafter.

As noted above, as used herein, the term computing system implemented financial management system includes: web-based, network, or Internet-based, financial management systems offered by financial institutions, such as banks and credit unions, financial management services, and/or any third parties, whether known or available at the time of filing or as developed thereafter; and non-web-based computing system implemented financial management software systems, packages, programs, modules, or applications. As used herein, the term financial management system includes, but is not limited to: banking related financial management systems, programs, modules, web-based systems, or applications; business financial management systems, packages, programs, modules, web-based systems, or applications; personal and/or small business financial management systems, packages, programs, modules, web-based systems, or applications; tax preparation systems, packages, programs, modules, web-based systems, or applications; accounting and/or invoicing systems, packages, programs, modules, web-based systems, or applications; and various other electronic transaction driven data management systems, packages, programs, modules, web-based systems, or applications, whether available or known at the time of filing or as developed later.

As also discussed above, in one embodiment, the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 203 is used to determine/project future balances of a selected account, such as a checking or savings account, at any designated future time, over the course of a predefined period of time. In one embodiment, the projected future balance is calculated/estimated using historical data about the account such as: recurring deposits to the account, such as a weekly, biweekly, or monthly paycheck, or any other type of recurring deposit into the selected account made on a regular periodic basis; recurring withdraws, outflows, and bill payments made out of the account on a regular periodic basis; pending activity, such as written but un-cashed checks; and/or any other recurring and/or user designated activity involving the selected account.

In one embodiment, the projected balance information/data obtained by the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 203 is used to help formulate automatic payment rules as discussed below.

In one embodiment, once the computing system implemented financial management system with projected balance feature is provided at PROVIDE COMPUTING SYSTEM IMPLEMENTED FINANCIAL MANAGEMENT SYSTEM WITH PROJECTED BALANCE FEATURE OPERATION 203, process flow proceeds to DEFINE USER GOAL OPERATION 205.

In one embodiment, at DEFINE USER GOAL OPERATION 205, a financial goal is defined by the user. Financial goals will vary from user-to-user, however, examples of user defined financial goals include, but are not limited to: balance related goals, such as the goal of maintaining a minimum account balance, maximizing an average account balance over a defined period, minimizing an average account balance over a defined period, leveling out cash flow over a defined period, or any other balance related goal defined by the user; bill payment prioritization related goals such as prioritization of bill payments so that bills of core importance, or highest interest rate, are paid off first, and/or any projected surpluses are directed to these accounts, or any other payment prioritization desired by the user; savings related goals, such as giving a savings program priority over paying off entire bill balances, or giving one saving program priority over another saving program and directing any projected account surpluses to the priority saving program account first, or any other savings related goal desired by the user; and any other short, medium, or long term financial goal as determined and/or defined by a user of the process for goal orientated financial management using projected balances.

As a further example, as noted above, one specific financial goal the user may define at DEFINE USER GOAL OPERATION 205 is the financial goal of maintaining a minimum balance in the selected account. In this instance, the user is specifying the goal of never allowing the balance of funds in a selected account to drop below a specified minimum balance. The user may choose the specific goal of maintaining a minimum balance for a variety of reasons. For instance, in some cases, the financial institution providing the selected account may require that a minimum account balance be maintained in the selected account in order for the user to receive free services such as, free checking, free automated bill pay, free money orders and/or any other services offered free of charge, so long as a minimum balance is maintained. In some cases, and user may wish to maintain a minimum balance as a buffer or safety net. In other instances, the user may choose the financial goal of maintaining a defined minimum balance at DEFINE USER GOAL OPERATION 205 for any one of numerous reasons.

As another example, and as also discussed above, one specific financial goal a user may define at DEFINE USER GOAL OPERATION 205 is the financial goal of maximizing the average balance in the selected account over a designated time frame. In this instance, the financial goal is to ensure that the payment of recurring bills is staggered, in one embodiment while still making the due date of each bill, such that the average balance in the selected account is maximized over a defined period of time. This goal is of particular interest to users who have multiple deposits into the selected account over the defined period of time. As one example, this particular goal may be of interest to a user who is paid multiple times a month, such as weekly or biweekly, or user who has a structured payment schedule, various clients who pay in staggered intervals, or any other periodic and regular deposit into the selected account. Another reason a user might wish to establish as a financial goal the maximization of average account balance would be to reap the benefits of certain interest plans/rates offered by financial institutions that are based on an average balance over a minimum amount of time per interest calculating interval. In other embodiments, a user may define the financial goal of maximizing the average balance in the selected account at DEFINE USER GOAL OPERATION 205 for any one of numerous reasons particular to the user.

As another example, one specific financial goal a user may define at DEFINE USER GOAL OPERATION 205 is the goal of ensuring that bills that are of the most importance to the user be paid in a prioritized manner. This specific goal is based on the users desire to ensure that some bills, such as mortgage payments, electric and gas bills, car payments, insurance payments, or any other defined high-priority bills, be paid before other, less essential, defined low priority, bills such as telephone bills, cable service bills, credit card bills, or any other defined lower priority bills are either paid, or paid in full. A user may choose this specific financial goal for various reasons such as, peace of mind, to deal with a temporary decrease in cash flow, to compensate for a very tight budget situation, or, in one case, to prioritize the payment of higher interest-rate credit account bills over lower interest-rate credit account bills. In other instances the user may choose the financial goal of prioritizing selected bill payments at DEFINE USER GOAL OPERATION 205 for any one of numerous reasons particular to the user.

As another example, one specific financial goal a user may define at DEFINE USER GOAL OPERATION 205 is the goal of prioritization of a savings program, or prioritization of one savings program over another savings program. This specific financial goal is based on either a user's desire to implement a savings plan in general, in preference to, for instance, paying off entire credit card balances, or a user's desire to prioritize a particular savings plan, such as the child's college savings plan, over another savings plan, such as a retirement plan. In some instances the user may choose to prioritize one savings program over another savings program based on tax benefits and/or interest rates. In other instances, a user may choose the goal of prioritizing savings plans at DEFINE USER GOAL OPERATION 205 based on any one of numerous possible reasons particular to the user.

As another example, one specific financial goal a user may define at DEFINE USER GOAL OPERATION 205 is the financial goal of minimizing interest paid out by the user, or maximizing interest paid in to the user. A user may define this particular financial goal based on a desire to minimize the interest paid on credit accounts. In this instance, highest interest rate accounts might be targeted for payment before other types of bills. In other instances, a user may chose the financial goal of maximizing interest paid in. In this instance, this particular financial goal is very similar to the goal discussed above regarding savings accounts. In other instances, a user may choose the goal of minimizing interest paid out, or maximizing interest paid in, at DEFINE USER GOAL OPERATION 205 based on any one of numerous possible reasons particular to the user.

Those of skill and the art will readily recognize the specific financial goals discussed above are only illustrative examples of user-defined financial goals, that numerous other financial goals are possible based on the needs of the user, and that virtually any financial goal of interest to the user can be defined at DEFINE USER GOAL OPERATION 205. Consequently, the specific financial goals discussed above, and the reasoning behind those financial goals, in no way limits the scope of the invention as set forth in the claims below.

In one embodiment, once a financial goal is defined by the user at DEFINE USER GOAL OPERATION 205, process flow proceeds to CREATE AUTOMATIC PAYMENT RULES BASED ON PROJECTED BALANCE CONSISTENT WITH USER GOAL OPERATION 207.

In one embodiment at CREATE AUTOMATIC PAYMENT RULES BASED ON PROJECTED BALANCE CONSISTENT WITH USER GOAL OPERATION 207 the projected balance data for the selected account obtained from the computing system implemented financial management system with projected balance feature provided at PROVIDE COMPUTING SYSTEM IMPLEMENTED FINANCIAL MANAGEMENT SYSTEM WITH PROJECTED BALANCE FEATURE OPERATION 203 is used to create automatic payment rules that help the user meet the financial goals defined at DEFINE USER GOAL OPERATION 205 within the framework of the user's pending balance, projected income, and anticipated inflow and outflow of funds in the selected account.

The specific automatic payment rules created at CREATE AUTOMATIC PAYMENT RULES BASED ON PROJECTED BALANCE CONSISTENT WITH USER GOAL OPERATION 207 will vary significantly from user-to-user and are highly dependent on the specific financial goal defined at DEFINE USER GOAL OPERATION 205. In addition, the specific automatic payment rules are created based on data regarding the projected income and anticipated deposits and/or outflow of funds to/from the selected account obtained from the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 203.

Some examples of specific rules that can be created at CREATE AUTOMATIC PAYMENT RULES BASED ON PROJECTED BALANCE CONSISTENT WITH USER GOAL OPERATION 207 include, but are not limited to: paying a specific bill on a specific date based on data obtained from the projected balance feature regarding the projected income and anticipated deposits and/or outflow of funds to/from the selected account; paying a minimum balance, or other specified amount, of a specified bill based on data obtained from the projected balance feature regarding the projected income and anticipated deposits and/or outflow of funds to/from the selected account; transferring funds from the selected account to/from another account based on data obtained from the projected balance feature regarding the projected income and anticipated deposits and/or outflow of funds to/from the selected account; directing uncommitted and/or surplus funds to specific bills and/or accounts based on data obtained from the projected balance feature regarding the projected income and anticipated deposits and/or outflow of funds to/from the selected account; paying specific high-priority bills before paying lower priority bills based on data obtained from the projected balance feature regarding the projected income and anticipated deposits and/or outflow of funds to/from the selected account; or any other automatic payment rule created based on data obtained from the projected balance feature regarding the projected income and anticipated deposits and/or outflow of funds to/from the selected account and in furtherance of the financial goal defined at DEFINE USER GOAL OPERATION 205.

As noted, the specific automatic payment rules created at CREATE AUTOMATIC PAYMENT RULES BASED ON PROJECTED BALANCE CONSISTENT WITH USER GOAL OPERATION 207 depends on the specific financial goal defined at DEFINE USER GOAL OPERATION 205. For instance, using the example discussed above where the specific financial goal defined at DEFINE USER GOAL OPERATION 205 is the financial goal of maintaining a minimum balance in the selected account, the automatic payment rules created might include, but are not limited to: paying specific bills on specific dates based on data obtained from the projected balance feature regarding the projected income and anticipated deposits and/or outflow of funds to/from the selected account so that the due dates of the specific bills are met, but the payments are staggered or held until a known recurring deposit is due to have been made into the selected account; paying only a minimum payment due for specified credit account bills, or paying a minimum payment due by the due date and then making a second payment on selected credit account bills after a known recurring deposit is due to have been made into the selected account; transferring funds to the selected account from another account based on data obtained from the projected balance feature regarding the projected income and anticipated deposits and/or outflow of funds to/from the selected account to ensure the minimum balance is maintained; or any other automatic payment rule created based on data obtained from the projected balance feature regarding the projected income and anticipated deposits and/or outflow of funds to/from the selected account that the user feels helps ensure the defined minimum balance of DEFINE USER GOAL OPERATION 205 is maintained.

As another example, using the specific instance discussed above where the specific financial goal defined at DEFINE USER GOAL OPERATION 205 is the financial goal of maximizing the average balance in the selected account over a designated time frame, the automatic payment rules created might include, but are not limited to: paying specific bills on specific dates based on data obtained from the projected balance feature regarding the projected income and anticipated deposits and/or outflow of funds to/from the selected account so that the due dates of the specific bills are met, but the payments are staggered or held until a known recurring deposit is due to have been made into the selected account, or a specified time/date has passed; paying a only a minimum payment due for specified credit account bills, or paying a minimum payment due by the due date and then making a second payment on specified credit account bills after a known recurring deposit is due to have been made into the selected account, or a specified time/date has passed; transferring funds to the selected account from another account based on data obtained from the projected balance feature regarding the projected income and anticipated deposits and/or outflow of funds to/from the selected account until a specified time/date has passed; or any other automatic payment rule, or rules, created based on data obtained from the projected balance feature regarding the projected income and anticipated deposits and/or outflow of funds to/from the selected account that the user feels helps maximize the average balance in the selected account over a designated time frame.

As another example, using the specific instance discussed above where the specific financial goal defined at DEFINE USER GOAL OPERATION 205 is the goal of ensuring that bills that are of the most importance to the user be paid in a prioritized manner, the automatic payment rules created might include, but are not limited to: paying specific defined high priority bills first on specific dates based on data obtained from the projected balance feature regarding the projected income and anticipated deposits and/or outflow of funds to/from the selected account so that the due dates of the specific bills are met; paying specific defined low priority bills on specific dates based on data obtained from the projected balance feature regarding the projected income and anticipated deposits and/or outflow of funds to/from the selected account so that the due dates of the specific bills are met, but the payments are staggered or held until a known recurring deposit is due to have been made into the selected account and/or payment to the high-priority bills has been made and/or has cleared; making only a minimum payment, or partial payment, on specified low priority bills, or making only a minimum payment, or partial payment, on a specified low priority bill by the due date and then making a second payment on selected low priority bills only after a known recurring deposit is due to have been made into the selected account, and/or payment to high-priority bills has been made and/or has cleared; transferring funds to the selected account from another account based on data obtained from the projected balance feature regarding the projected income and anticipated deposits and/or outflow of funds to/from the selected account to ensure the high priority bills are paid and payment clears; or any other automatic payment rule, or rules, created based on data obtained from the projected balance feature regarding the projected income and anticipated deposits and/or outflow of funds to/from the selected account that the user feels helps ensure that the priority bills are paid and that payment clears.

As another example, using the specific instance discussed above where the specific financial goal defined at DEFINE USER GOAL OPERATION 205 is the goal of prioritizing the funding of a savings program, or of funding one savings program over another savings program, the automatic payment rules created might include: paying only a minimum balance, or other specified amount, of a specified credit account bills based on data obtained from the projected balance feature regarding the projected income and anticipated deposits and/or outflow of funds to/from the selected account and then transferring uncommitted or surplus funds as calculated based on data obtained from the projected balance feature regarding the projected income and anticipated deposits and/or outflow of funds to/from the selected account, from the selected account to another savings account or transferring uncommitted or surplus funds from the selected account to one savings account up to a predefined limit and then transferring any remaining uncommitted or surplus funds from the selected account to a second savings account; or any other automatic payment rule, or rules, created based on data obtained from the projected balance feature regarding the projected income and anticipated deposits and/or outflow of funds to/from the selected account that the user feels helps ensure that the one or more savings accounts are funded and/or are funded in a prioritized manner.

As another example, using the specific instance discussed above where the specific financial goal defined at DEFINE USER GOAL OPERATION 205 is the goal of minimizing interest paid by the user, the automatic payment rules created might include, but are not limited to: paying only a minimum payment due for specified lower interest credit-based bills and then directing that all uncommitted or surplus funds, as calculated based on data obtained from the projected balance feature regarding the projected income and anticipated deposits and/or outflow of funds to/from the selected account, to a specified high interest credit-based bill; transferring funds to the selected account from another account based on data obtained from the projected balance feature regarding the projected income and anticipated deposits and/or outflow of funds to/from the selected account to ensure funds are available to pay off the entire balance, or a larger portion of the balance, of a specified high interest credit-based account; or any other automatic payment rule, or rules, created based on data obtained from the projected balance feature regarding the projected income and anticipated deposits and/or outflow of funds to/from the selected account that the user feels helps minimize interest the user pays out.

As another example, using the specific instance discussed above where the specific financial goal defined at DEFINE USER GOAL OPERATION 205 is the goal of maximizing interest paid to the user, the automatic payment rules created might include, but are not limited to: paying specific bills on specific dates based on data obtained from the projected balance feature regarding the projected income and anticipated deposits and/or outflow of funds to/from the selected account so that the due dates of the specific bills are met, but the payments are staggered or held until a known recurring deposit is due to have been made into the selected account in order to maximize the average balance in a high interest bearing account.

As noted above, those of skill and the art will readily recognize the specific financial goals discussed above are only illustrative examples of user-defined financial goals, that numerous other financial goals are possible based on the needs of the user, and that virtually any financial goal can be defined at DEFINE USER GOAL OPERATION 205. In addition, since the specific automatic payment rules created at CREATE AUTOMATIC PAYMENT RULES BASED ON PROJECTED BALANCE CONSISTENT WITH USER GOAL OPERATION 207 depend on the specific financial goal defined at DEFINE USER GOAL OPERATION 205, it follows that numerous specific automatic payment rules are also possible based on the needs of the user and the selected financial goal and that the few specific automatic payment rules discussed above were chosen for illustrative purposes only. Consequently, the specific goals and automatic payment rules discussed above, and the reasoning behind those goals and rules, in no way limits the scope of the invention as set forth in the claims below.

In addition, any of the goals and automatic payments rules discussed above can be combined in any way necessary to meet the needs of a given user. Consequently, the specific combinations and associations between automatic payment rules and goals discussed above are illustrative only and in no way limit the scope as set forth in the claims below.

In one embodiment, once the projected balance data for the selected account obtained from the computing system implemented financial management system with projected balance feature provided at PROVIDE COMPUTING SYSTEM IMPLEMENTED FINANCIAL MANAGEMENT SYSTEM WITH PROJECTED BALANCE FEATURE OPERATION 203 is used to create automatic payment rules that help the user meet the goals defined at DEFINE USER GOAL OPERATION 205 within the framework of the user's pending balance, projected income and anticipated inflow and outflow of funds in the selected account at CREATE AUTOMATIC PAYMENT RULES BASED ON PROJECTED BALANCE CONSISTENT WITH USER GOAL OPERATION 207, process flow proceeds to IMPLEMENT AUTOMATIC PAYMENT RULES OPERATION 212.

In one embodiment, at IMPLEMENT AUTOMATIC PAYMENT RULES OPERATION 212 the automatic payment rules created at CREATE AUTOMATIC PAYMENT RULES BASED ON PROJECTED BALANCE CONSISTENT WITH USER GOAL OPERATION 207 that help the user meet the goals defined at DEFINE USER GOAL OPERATION 205 within the framework of the user's pending balance, projected income and anticipated inflow and outflow of funds in the selected account as determined at by the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 203 are implemented and, in one embodiment, financial transactions are then enacted, or action suggested, based on the automatic payment rules and the level of automation for implementing those rules defined by the user.

As discussed in more detail below, in some, highly automated, embodiments, once the automatic payment rules are created at CREATE AUTOMATIC PAYMENT RULES BASED ON PROJECTED BALANCE CONSISTENT WITH USER GOAL OPERATION 207, process for goal orientated financial management using projected balances 200 takes over the majority of bill payment, account transfer, and savings, activity automatically at IMPLEMENT AUTOMATIC PAYMENT RULES OPERATION 212, only notifying a user of the action. In other, largely manual, embodiments, once the automatic payment rules are created at CREATE AUTOMATIC PAYMENT RULES BASED ON PROJECTED BALANCE CONSISTENT WITH USER GOAL OPERATION 207, each potential action is only recommended by process for goal orientated financial management using projected balances 200 at IMPLEMENT AUTOMATIC PAYMENT RULES OPERATION 212. The recommended action and is then brought to the user's attention via a notification or alert, but the action itself must be approved and/or manually undertaken by the user. In other embodiments, the level of automation is anywhere between these two extremes, with either specific actions being designated manual or automatic and/or specific time frames being designated manual or automatic and/or transaction specific parameters, such as amount of money being transacted, determining if a specific transaction is automated or manual.

In one embodiment, once the automatic payment rules created at CREATE AUTOMATIC PAYMENT RULES BASED ON PROJECTED BALANCE CONSISTENT WITH USER GOAL OPERATION 207 that help the user meet the goals defined at DEFINE USER GOAL OPERATION 205 within the framework of the user's pending balance, projected income and anticipated inflow and outflow of funds in the selected account as determined at by the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 203 are implemented at IMPLEMENT AUTOMATIC PAYMENT RULES OPERATION 212, process flow proceeds to END OPERATION 220 and process for goal orientated financial management using projected balances 200 ends and/or returns to DEFINE USER GOAL OPERATION 205 to await the next iteration.

Using process for goal orientated financial management using projected balances 200, the power of projected balance features now offered in some computing system implemented financial management systems is harnessed to provide a user of process for goal orientated financial management using projected balances 200 with the ability to define financial goals and create specific automated payment rules consistent with those goals and the user's projected account balance. Consequently, automatic payment rules can be created based on more than just the desire to automate a payment to a particular party, but instead, payments are made in amounts, and at times, that are most consistent with the user's larger goals. Therefore, a computing system implemented financial management system incorporating process for goal orientated financial management using projected balances 200 takes on the role of a virtual financial planning partner for the user.

As discussed above, in some, largely manual, embodiments, once the automatic payment rules are created using the process for goal orientated financial management using projected balances, each potential action/transaction to be taken based on the automatic payment rules created is only recommended by the process for goal orientated financial management using projected balances. The recommended action and is then brought to the user's attention via a notification or alert, but the action/transaction itself must be approved and/or manually undertaken by the user.

Figure 3A:
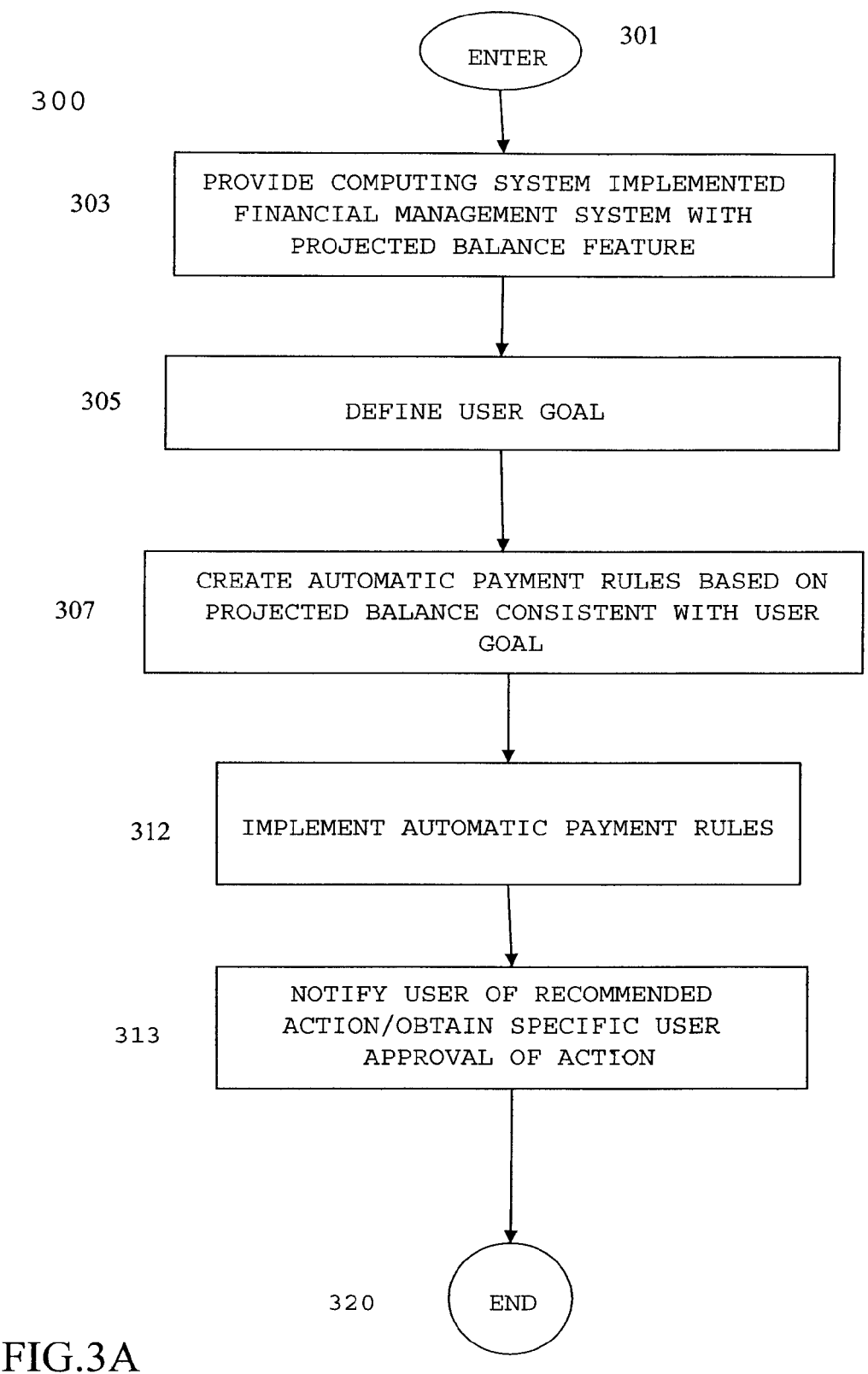
FIG. 3A is a flow chart depicting a process for goal orientated financial management using projected balances in accordance with one embodiment.

FIG. 3A is a flow chart depicting a process for goal orientated financial management using projected balances 300 in accordance with one embodiment. Process for goal orientated financial management using projected balances 300 begins at ENTER OPERATION 301 and process flow proceeds to PROVIDE COMPUTING SYSTEM IMPLEMENTED FINANCIAL MANAGEMENT SYSTEM WITH PROJECTED BALANCE FEATURE OPERATION 303.

In one embodiment: PROVIDE COMPUTING SYSTEM IMPLEMENTED FINANCIAL MANAGEMENT SYSTEM WITH PROJECTED BALANCE FEATURE OPERATION 303; DEFINE USER GOAL OPERATION 305; and CREATE AUTOMATIC PAYMENT RULES BASED ON PROJECTED BALANCE CONSISTENT WITH USER GOAL OPERATION 307 of process for goal orientated financial management using projected balances 300 of FIG. 3A are substantially identical to: PROVIDE COMPUTING SYSTEM IMPLEMENTED FINANCIAL MANAGEMENT SYSTEM WITH PROJECTED BALANCE FEATURE OPERATION 203; DEFINE USER GOAL OPERATION 205; and CREATE AUTOMATIC PAYMENT RULES BASED ON PROJECTED BALANCE CONSISTENT WITH USER GOAL OPERATION 207, discussed above with respect to process for goal orientated financial management using projected balances 200 of FIG. 2. Consequently, the discussion above with respect to: PROVIDE COMPUTING SYSTEM IMPLEMENTED FINANCIAL MANAGEMENT SYSTEM WITH PROJECTED BALANCE FEATURE OPERATION 203; DEFINE USER GOAL OPERATION 205; and CREATE AUTOMATIC PAYMENT RULES BASED ON PROJECTED BALANCE CONSISTENT WITH USER GOAL OPERATION 207, of process for goal orientated financial management using projected balances 200 of FIG. 2 is applicable to, and incorporated in it's entirety for, similarly identified elements of: PROVIDE COMPUTING SYSTEM IMPLEMENTED FINANCIAL MANAGEMENT SYSTEM WITH PROJECTED BALANCE FEATURE OPERATION 303; DEFINE USER GOAL OPERATION 305; and CREATE AUTOMATIC PAYMENT RULES BASED ON PROJECTED BALANCE CONSISTENT WITH USER GOAL OPERATION 307, of process for goal orientated financial management using projected balances 300 of FIG. 3A.

In one embodiment, once the projected balance data for the selected account obtained from the computing system implemented financial management system with projected balance feature provided at PROVIDE COMPUTING SYSTEM IMPLEMENTED FINANCIAL MANAGEMENT SYSTEM WITH PROJECTED BALANCE FEATURE OPERATION 303 is used to create automatic payment rules that help the user meet the goals defined at DEFINE USER GOAL OPERATION 305 within the framework of the user's pending balance, projected income and anticipated inflow and outflow of funds in the selected account at CREATE AUTOMATIC PAYMENT RULES BASED ON PROJECTED BALANCE CONSISTENT WITH USER GOAL OPERATION 307, process flow proceeds to IMPLEMENT AUTOMATIC PAYMENT RULES OPERATION 312.

In one embodiment, at IMPLEMENT AUTOMATIC PAYMENT RULES OPERATION 312 the automatic payment rules created at CREATE AUTOMATIC PAYMENT RULES BASED ON PROJECTED BALANCE CONSISTENT WITH USER GOAL OPERATION 307 are implemented. However, in this embodiment, each potential action/transaction in accordance with the automatic payment rules is only recommended by process for goal orientated financial management using projected balances 300 at NOTIFY USER OF RECOMMENDED ACTION/OBTAIN SPECIFIC USER APPROVAL OF ACTION OPERATION 313. The recommended action is then brought to the user's attention via a recommendation notification, or alert, but the action itself must be approved and/or manually undertaken by the user.

Consequently, in this embodiment, the user maintains significant control over the bill payment process and process for goal orientated financial management using projected balances 300 acts in more of an advisory role than an action taking role.

In one embodiment, the recommendation notification generated at NOTIFY USER OF RECOMMENDED ACTION/OBTAIN SPECIFIC USER APPROVAL OF ACTION OPERATION 313 is delivered to the user via any one of numerous known mechanisms including, but not limited to: a pop-up window; the generation and display of a report; an e-mail; a telephone text message or automated voice mail; standard or expedited mail delivery; or any other electronic or non-electronic alert system whereby a user can be informed of a recommended financial transaction, whether known at the time of filing or as developed thereafter.

In one embodiment, the recommendation notification generated at NOTIFY USER OF RECOMMENDED ACTION/OBTAIN SPECIFIC USER APPROVAL OF ACTION OPERATION 313 is issued via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment communication is facilitated using analog modems, digital modems, network interface cards, broadband connections, or any other means for communicably coupling computing systems, whether known at the time of filing or as later developed.

In one embodiment, the recommendation notification generated at NOTIFY USER OF RECOMMENDED ACTION/OBTAIN SPECIFIC USER APPROVAL OF ACTION OPERATION 313 is distributed via phone lines, phone signals or any other form of electronic audio/video/text or alert messaging and/or communication known at the time of filing or as later developed.

As noted above, in one embodiment, the recommendation notification generated at NOTIFY USER OF RECOMMENDED ACTION/OBTAIN SPECIFIC USER APPROVAL OF ACTION OPERATION 313 is in the form of a pop-up display shown on a display device such as display devices 115, 165, 125 of FIG. 1. FIG. 3B shows a representation of a display screen 331 on display device 330, such as display devices 115 and 165 of FIG. 1, including recommendation notification display 340 (FIG. 3B) generated at NOTIFY USER OF RECOMMENDED ACTION/OBTAIN SPECIFIC USER APPROVAL OF ACTION OPERATION 313.

As seen in FIG. 3B, recommendation notification screen 340 includes recommendation text 341. In one embodiment, recommendation text informs the user of a recommended financial action/transaction based on the user's defined financial goal from DEFINE USER GOAL OPERATION 305 and the resulting automatic payment rules created at CREATE AUTOMATIC PAYMENT RULES BASED ON PROJECTED BALANCE CONSISTENT WITH USER GOAL OPERATION 307, as well as, or in light of, projected balance data from the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 303.

As an illustration of one embodiment of process for goal orientated financial management using projected balances 300, it is stipulated that a user wants to deposit $12,000.00 a year into a college savings account for his or her child and that this is a defined financial goal. Consequently, recommendation text 341 indicates, in this specific example, that a user has defined the financial goal of depositing $12,000.00 a year into a college savings account at DEFINE USER GOAL OPERATION 305. In support of this goal, the automatic payment rule is created at CREATE AUTOMATIC PAYMENT RULES BASED ON PROJECTED BALANCE CONSISTENT WITH USER GOAL OPERATION 307 that only minimal payments should be made to credit based accounts until the financial goal of depositing $12,000.00 a year into a college savings account is met. In addition, in this specific example, using the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 303, process for goal orientated financial management using projected balances 300 has determined that if only the minimum payments due are paid to the user's credit accounts during the current pay period, there will be a surplus of uncommitted funds in the amount of $1000.00 available. Therefore, in this specific example, recommendation text 341 recommends making only the minimum payment toward the user's credit accounts and then transferring 1000.00 into the child's college savings account.

In one embodiment, recommendation notification screen 340 generated at NOTIFY USER OF RECOMMENDED ACTION/OBTAIN SPECIFIC USER APPROVAL OF ACTION OPERATION 313 requires a positive action/acknowledgement such as check box 343 (FIG. 3B) from the user before recommendation notification screen 340 can be closed or otherwise terminated. In one embodiment, checking check box 343 represents an approval of the recommended transaction by the user and, once check box 343 is checked, i.e., user approval is obtained for the specific action, process for goal orientated financial management using projected balances 300 automatically takes the recommended action. In other embodiments, checking check box 343 represents the user's acknowledgement of the recommendation and it is left to the user to take the recommended action if he or she so desires.

In one embodiment, once the automatic payment rules created at CREATE AUTOMATIC PAYMENT RULES BASED ON PROJECTED BALANCE CONSISTENT WITH USER GOAL OPERATION 307 are implemented at IMPLEMENT AUTOMATIC PAYMENT RULES OPERATION 312, and recommendation notifications are generated and issued at NOTIFY USER OF RECOMMENDED ACTION/OBTAIN SPECIFIC USER APPROVAL OF ACTION OPERATION 313, process flow proceeds to END OPERATION 320 and process for goal orientated financial management using projected balances 300 ends and/or returns to DEFINE USER GOAL OPERATION 305 to await the next iteration.

In some, highly automated, embodiments, once the automatic payment rules are created, the process for goal orientated financial management using projected balances takes over the majority of bill payment, account transfer, and savings activity automatically, only notifying a user of the action taken. In this embodiment, the user loses some control but gains the benefits of a more automated, "hands off" system.

Figure 4A:
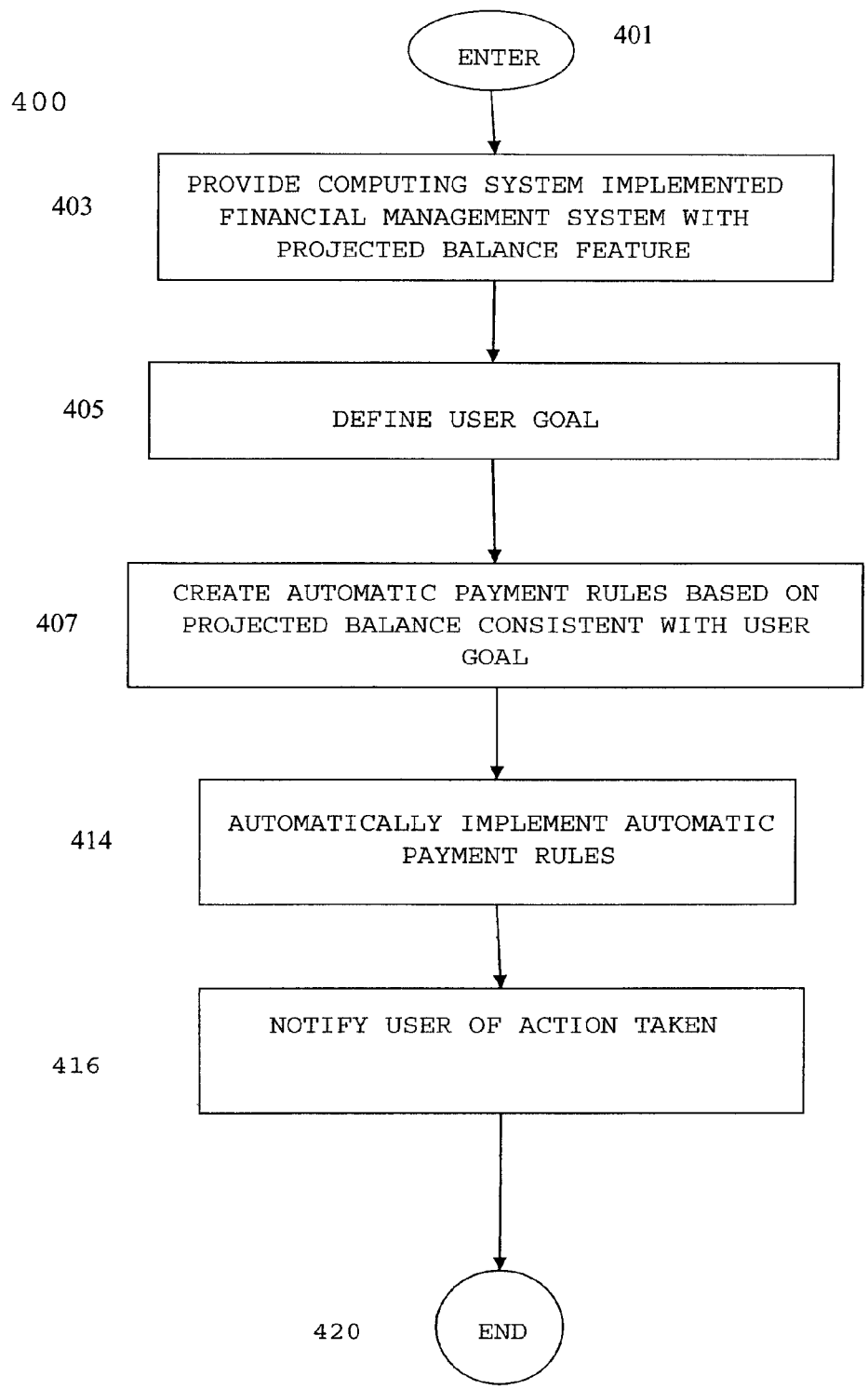
FIG. 4A is a flow chart depicting a process for goal orientated financial management using projected balances in accordance with one embodiment.

FIG. 4A is a flow chart depicting a process for goal orientated financial management using projected balances 400 in accordance with one embodiment. Process for goal orientated financial management using projected balances 400 begins at ENTER OPERATION 401 and process flow proceeds to PROVIDE COMPUTING SYSTEM IMPLEMENTED FINANCIAL MANAGEMENT SYSTEM WITH PROJECTED BALANCE FEATURE OPERATION 403.

In one embodiment: PROVIDE COMPUTING SYSTEM IMPLEMENTED FINANCIAL MANAGEMENT SYSTEM WITH PROJECTED BALANCE FEATURE OPERATION 403; DEFINE USER GOAL OPERATION 405; and CREATE AUTOMATIC PAYMENT RULES BASED ON PROJECTED BALANCE CONSISTENT WITH USER GOAL OPERATION 407 of process for goal orientated financial management using projected balances 400 of FIG. 4A are substantially identical to: PROVIDE COMPUTING SYSTEM IMPLEMENTED FINANCIAL MANAGEMENT SYSTEM WITH PROJECTED BALANCE FEATURE OPERATION 203; DEFINE USER GOAL OPERATION 205; and CREATE AUTOMATIC PAYMENT RULES BASED ON PROJECTED BALANCE CONSISTENT WITH USER GOAL OPERATION 207 discussed above with respect to process for goal orientated financial management using projected balances 200 of FIG. 2. Consequently, the discussion above with respect to: PROVIDE COMPUTING SYSTEM IMPLEMENTED FINANCIAL MANAGEMENT SYSTEM WITH PROJECTED BALANCE FEATURE OPERATION 203; DEFINE USER GOAL OPERATION 205; and CREATE AUTOMATIC PAYMENT RULES BASED ON PROJECTED BALANCE CONSISTENT WITH USER GOAL OPERATION 207; of process for goal orientated financial management using projected balances 200 of FIG. 2 is applicable to, and incorporated in it's entirety for, similarly identified elements of: PROVIDE COMPUTING SYSTEM IMPLEMENTED FINANCIAL MANAGEMENT SYSTEM WITH PROJECTED BALANCE FEATURE OPERATION 403; DEFINE USER GOAL OPERATION 405; and CREATE AUTOMATIC PAYMENT RULES BASED ON PROJECTED BALANCE CONSISTENT WITH USER GOAL OPERATION 407, of process for goal orientated financial management using projected balances 400 of FIG. 4A.

In one embodiment, once the projected balance data for the selected account obtained from the computing system implemented financial management system with projected balance feature provided at PROVIDE COMPUTING SYSTEM IMPLEMENTED FINANCIAL MANAGEMENT SYSTEM WITH PROJECTED BALANCE FEATURE OPERATION 403 is used to create automatic payment rules that help the user meet the goals defined at DEFINE USER GOAL OPERATION 405 within the framework of the user's pending balance, projected income and anticipated inflow and outflow of funds in the selected account at CREATE AUTOMATIC PAYMENT RULES BASED ON PROJECTED BALANCE CONSISTENT WITH USER GOAL OPERATION 407, process flow proceeds to AUTOMATICALLY IMPLEMENT AUTOMATIC PAYMENT RULES OPERATION 414.

In one embodiment, at AUTOMATICALLY IMPLEMENT AUTOMATIC PAYMENT RULES OPERATION 414, the automatic payment rules created at CREATE AUTOMATIC PAYMENT RULES BASED ON PROJECTED BALANCE CONSISTENT WITH USER GOAL OPERATION 407 are automatically implemented in light of the projected balance data from the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 403.

In one embodiment, once the automatic payment rules created at CREATE AUTOMATIC PAYMENT RULES BASED ON PROJECTED BALANCE CONSISTENT WITH USER GOAL OPERATION 407 are automatically implemented at AUTOMATICALLY IMPLEMENT AUTOMATIC PAYMENT RULES OPERATION 414, process flow proceeds to NOTIFY USER OF ACTION TAKEN OPERATION 416.

In one embodiment, at NOTIFY USER OF ACTION TAKEN OPERATION 416 a notification of the action(s) taken at AUTOMATICALLY IMPLEMENT AUTOMATIC PAYMENT RULES OPERATION 414 based on the automatic payment rules CREATE AUTOMATIC PAYMENT RULES BASED ON PROJECTED BALANCE CONSISTENT WITH USER GOAL OPERATION 407 is generated and sent to the user via any of the numerous mechanisms known in the art for providing a user with notification of an action taken, whether known at the time of filing or as developed thereafter, and/or as discussed above with respect to NOTIFY USER OF RECOMMENDED ACTION/OBTAIN SPECIFIC USER APPROVAL OF ACTION OPERATION 313 of process for goal orientated financial management using projected balances 300 of FIGS. 3A and 3B.

Returning to FIG. 4A, in one embodiment, the notification generated at NOTIFY USER OF ACTION TAKEN OPERATION 416 is in the form of a pop-up display shown on a display device such as display devices 115, 165, 125 of FIG. 1. FIG. 4B shows a representation of a display screen 431 on display device 430, such as display devices 115 and 165 of FIG. 1, including notification screen 440 (FIG. 4B) generated at NOTIFY USER OF ACTION TAKEN OPERATION 416.

As seen in FIG. 4B, notification screen 440 includes notification text 441. In one embodiment, notification text 441 informs the user of the action(s) taken based on the user's defined financial goal from DEFINE USER GOAL OPERATION 405 and the resulting automatic payment rules created at CREATE AUTOMATIC PAYMENT RULES BASED ON PROJECTED BALANCE CONSISTENT WITH USER GOAL OPERATION 407, as well as, or in light of, projected balance data from the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 403.

As an illustration of one embodiment of process for goal orientated financial management using projected balances 400, it is stipulated that a user wants to maintain a minimum balance in the selected account of $3000.00 over the course of a month. In this specific example, it is further stipulated that the user is paid twice a month, on the 1st and the $15^{th}$ of the month. Consequently, in this specific example, a user has defined the financial goal of maintaining a minimum balance in the selected account of $3000.00 at DEFINE USER GOAL OPERATION 405. In support of this goal, an automatic payment rule is created at CREATE AUTOMATIC PAYMENT RULES BASED ON PROJECTED BALANCE CONSISTENT WITH USER GOAL OPERATION 407 that payment of the user's car loan, due the $25^{th}$ of the month, be made on the $16^{th}$ of the month, after the user's $15^{th}$ of the month paycheck has been deposited. As a result, notification text 441 indicates that payment of the user's car loan, due the $25^{th}$ of the month, will be made on the $16^{th}$ of the month after the user's $15^{th}$ of the month paycheck has been deposited.

a. In one embodiment, notification screen 440 generated at NOTIFY USER OF RECOMMENDED ACTION/OBTAIN SPECIFIC USER APPROVAL OF ACTION OPERATION 413 requires a positive action/acknowledgement such as check box 443 (FIG. 4B) from the user before notification screen 440 can be closed or otherwise terminated.

b. In one embodiment, once the automatic payment rules created at CREATE AUTOMATIC PAYMENT RULES BASED ON PROJECTED BALANCE CONSISTENT WITH USER GOAL OPERATION 407 that help the user meet the goals defined at DEFINE USER GOAL OPERATION 405 within the framework of the user's pending balance, projected income and anticipated inflow and outflow of funds in the selected account as determined at by the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 403 are automatically implemented at AUTOMATICALLY IMPLEMENT AUTOMATIC PAYMENT RULES OPERATION 414, and the user is notified of the action taken at NOTIFY USER OF ACTION TAKEN OPERATION 416, process flow proceeds to END OPERATION 420 and process for goal orientated financial management using projected balances 400 is ended and/or returns to DEFINE USER GOAL OPERATION 405 to await the next iteration.

In some embodiments, the level of automation is set anywhere between the two extremes represented by process for goal orientated financial management using projected balances 300 of FIG. 3A and process for goal orientated financial management using projected balances 400 of FIG. 4A, with either specific actions being designated manual or automatic and/or specific time frames being designated manual or automatic and/or transaction specific parameters, such as amount of money being transacted, determining if a specific transaction is automated or manual.

Figure 5A:
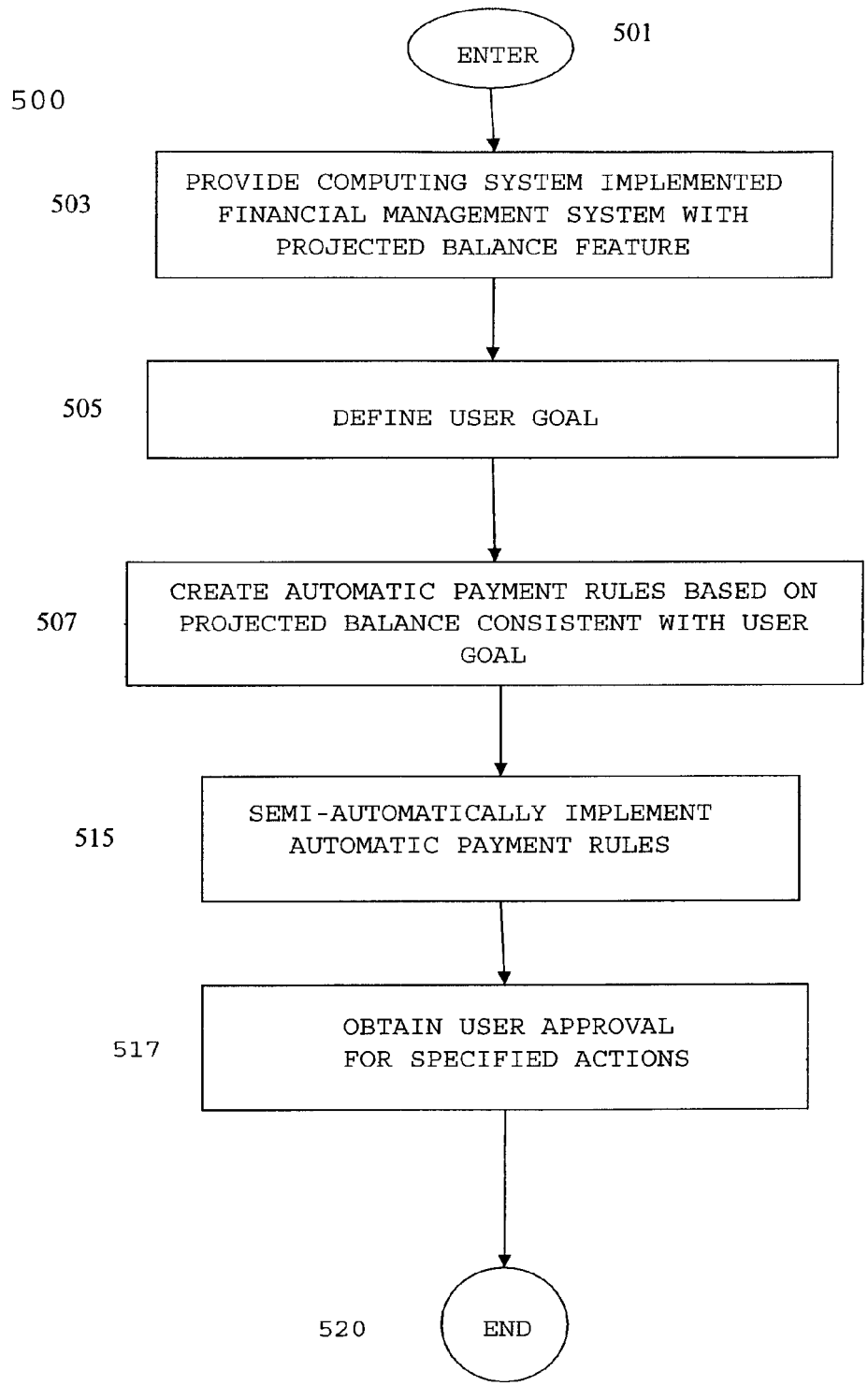
FIG. 5A is a flow chart depicting a process for goal orientated financial management using projected balances in accordance with one embodiment.

FIG. 5A is a flow chart depicting a process for goal orientated financial management using projected balances 500 in accordance with one embodiment. Process for goal orientated financial management using projected balances 500 begins at ENTER OPERATION 501 and process flow proceeds to PROVIDE COMPUTING SYSTEM IMPLEMENTED FINANCIAL MANAGEMENT SYSTEM WITH PROJECTED BALANCE FEATURE OPERATION 503.

In one embodiment: PROVIDE COMPUTING SYSTEM IMPLEMENTED FINANCIAL MANAGEMENT SYSTEM WITH PROJECTED BALANCE FEATURE OPERATION 503; DEFINE USER GOAL OPERATION 505; and CREATE AUTOMATIC PAYMENT RULES BASED ON PROJECTED BALANCE CONSISTENT WITH USER GOAL OPERATION 507 of process for goal orientated financial management using projected balances 500 of FIG. 5A are substantially identical to: PROVIDE COMPUTING SYSTEM IMPLEMENTED FINANCIAL MANAGEMENT SYSTEM WITH PROJECTED BALANCE FEATURE OPERATION 203; DEFINE USER GOAL OPERATION 205; and CREATE AUTOMATIC PAYMENT RULES BASED ON PROJECTED BALANCE CONSISTENT WITH USER GOAL OPERATION 207 discussed above with respect to process for goal orientated financial management using projected balances 200 of FIG. 2. Consequently, the discussion above with respect to: PROVIDE COMPUTING SYSTEM IMPLEMENTED FINANCIAL MANAGEMENT SYSTEM WITH PROJECTED BALANCE FEATURE OPERATION 203; DEFINE USER GOAL OPERATION 205; and CREATE AUTOMATIC PAYMENT RULES BASED ON PROJECTED BALANCE CONSISTENT WITH USER GOAL OPERATION 207; of process for goal orientated financial management using projected balances 200 of FIG. 2 is applicable to, and incorporated in it's entirety for, similarly identified elements of: PROVIDE COMPUTING SYSTEM IMPLEMENTED FINANCIAL MANAGEMENT SYSTEM WITH PROJECTED BALANCE FEATURE OPERATION 503; DEFINE USER GOAL OPERATION 505; and CREATE AUTOMATIC PAYMENT RULES BASED ON PROJECTED BALANCE CONSISTENT WITH USER GOAL OPERATION 507, of process for goal orientated financial management using projected balances 500 of FIG. 5A.

In one embodiment, once the projected balance data for the selected account obtained from the computing system implemented financial management system with projected balance feature provided at PROVIDE COMPUTING SYSTEM IMPLEMENTED FINANCIAL MANAGEMENT SYSTEM WITH PROJECTED BALANCE FEATURE OPERATION 503 is used to create automatic payment rules that help the user meet the financial goals defined at DEFINE USER GOAL OPERATION 505 within the framework of the user's pending balance, projected income and anticipated inflow and outflow of funds in the selected account at CREATE AUTOMATIC PAYMENT RULES BASED ON PROJECTED BALANCE CONSISTENT WITH USER GOAL OPERATION 507, process flow proceeds to SEMI-AUTOMATICALLY IMPLEMENT AUTOMATIC PAYMENT RULES OPERATION 515.

In one embodiment, at SEMI-AUTOMATICALLY IMPLEMENT AUTOMATIC PAYMENT RULES OPERATION 515 some of the automatic payment rules created at CREATE AUTOMATIC PAYMENT RULES BASED ON PROJECTED BALANCE CONSISTENT WITH USER GOAL OPERATION 507 are automatically implemented in light of the projected balance data from the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 503, but the automatic payment rules are implemented within certain threshold values and/or parameters that determine whether a given proposed transaction, or class of transactions, based on the automatic payment rules is to be implemented automatically, or only with user approval.

In one embodiment, the parameters/thresholds include, but are not limited to: the transaction amount, with transaction amounts over a predefined amount requiring user approval; the time frame of the transaction, with user approval being required for transactions taking place in defined time frames such as around tax payments or life events like moving, marriage or births; any instance where one defined financial goal, or one or more of its associated automatic payment rules, are in conflict with another defined financial goal, or one or more of its associated automatic payment rules; or any other parameters defined by the user as requiring user approval.

In one embodiment, once the thresholds and/or parameters that determine whether a given proposed transaction, or class of transactions, based on the automatic payment rules is to be implemented automatically or only with user approval are defined, when a given transaction, or class of transactions requires user approval, a user alert/approval request is generated OBTAIN USER APPROVAL FOR SPECIFIED ACTIONS OPERATION 517.

In one embodiment, at OBTAIN USER APPROVAL FOR SPECIFIED ACTIONS OPERATION 517 a user alert/approval request is generated and sent to the user via any of the numerous mechanisms known in the art for providing a user with notification or an alert, whether known at the time of filing or as developed thereafter, and/or as discussed above with respect to NOTIFY USER OF RECOMMENDED ACTION/OBTAIN SPECIFIC USER APPROVAL OF ACTION OPERATION 313 of process for goal orientated financial management using projected balances 300 of FIGS. 3A and 3B.

Returning to FIG. 5A, in one embodiment, the user alert/approval request generated at OBTAIN USER APPROVAL FOR SPECIFIED ACTIONS OPERATION 517 is in the form of a pop-up display shown on a display device such as display devices 115, 165, 125 of FIG. 1. FIG. 5B shows a representation of a display screen 531 on display device 530, such as display devices 115 and 165 of FIG. 1, including user alert/approval request display 540 (FIG. 5B) generated at OBTAIN USER APPROVAL FOR SPECIFIED ACTIONS OPERATION 517.

As seen in FIG. 5B, user alert/approval request 540 includes text 541. In one embodiment, text 541 informs the user of proposed transaction requiring the user's approval and an explanation as to why approval is required.

As an illustration of one embodiment of process for goal orientated financial management using projected balances 500, it is stipulated that a user wants pay the minimum interest on his or her credit accounts. Consequently, text 541 indicates, in this specific example, that a user has defined the financial goal of minimizing interest paid out at DEFINE USER GOAL OPERATION 305. In support of this financial goal, an automatic payment rule is created at CREATE AUTOMATIC PAYMENT RULES BASED ON PROJECTED BALANCE CONSISTENT WITH USER GOAL OPERATION 507 that only minimal payments should be made to all other credit based accounts and then all surplus funds are to be directed to paying off a high interest credit account, designated high interest credit account #1 in this example. In addition, in this specific example, using the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 503, process for goal orientated financial management using projected balances 500 has determined that if only minimum payments due are paid to the user's other credit accounts during the current pay period, there will be a surplus of uncommitted funds in the amount of $1000.00 available. Therefore, in this specific example, the automatic payment rules would normally automatically pay only the minimum payments due on the other credit accounts and then direct the projected surplus $1000.00 to high interest credit account #1. However, in this specific example, it is stipulated that the user has also defined a payment threshold parameter of $500.00 whereby any payment of over $500.00 must be approved by the user. Consequently, user alert/approval request screen 540 is generated and issued at OBTAIN USER APPROVAL FOR SPECIFIED ACTIONS OPERATION 517.

In one embodiment, user alert/approval request screen 540 generated at NOTIFY USER OF RECOMMENDED ACTION/OBTAIN SPECIFIC USER APPROVAL OF ACTION OPERATION 513 requires a positive action/acknowledgement/approval such as check boxes 543A and 543B (FIG. 5B) from the user.

In one embodiment, once the automatic payment rules created at CREATE AUTOMATIC PAYMENT RULES BASED ON PROJECTED BALANCE CONSISTENT WITH USER GOAL OPERATION 507 that help the user meet the goals defined at DEFINE USER GOAL OPERATION 505 within the framework of the user's pending balance, projected income and anticipated inflow and outflow of funds in the selected account, as determined at by the projected balance feature of the computing system implemented financial management system provided at PROVIDE COMPUTING SYSTEM IMPLEMENTED FINANCIAL MANAGEMENT SYSTEM WITH PROJECTED BALANCE FEATURE OPERATION 503, are semi-automatically implemented at SEMI-AUTOMATICALLY IMPLEMENT AUTOMATIC PAYMENT RULES OPERATION 515, and any required user alert/approval requests are generated and issued at OBTAIN USER APPROVAL FOR SPECIFIED ACTIONS OPERATION 517, process flow proceeds to END OPERATION 520 and process for goal orientated financial management using projected balances 500 is ended and/or returns to DEFINE USER GOAL OPERATION 505 to await the next iteration.

In some embodiments, some, or all, of the data associated with, created by, processed by, used by, or modified by, a process for goal orientated financial management using projected balances, such as processes 200, 300, 400, and 500, the operation thereof and/or displays 340, 440 and 540, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; the user's financial institution; a third party financial institution; the provider of a parent system employing a process for goal orientated financial management using projected balances such as processes 200, 300, 400, and 500; the provider of a process for goal orientated financial management using projected balances such as processes 200, 300, 400, and 500; or any other parties.

Using the method and apparatus for goal orientated financial management using projected balances disclosed herein, the power of projected balance features now offered in some computing system implemented financial management systems is harnessed to provide a user of the method and apparatus for goal orientated financial management using projected balances with the ability to define financial goals and create specific automated payment rules consistent with those goals, and the user's projected account balance. Consequently, automatic payment rules can be created based on more than just the desire to automate a payment to a particular party and required payments can be made in amounts, and at times, that are most consistent with the user's larger goals. Therefore, a computing system implemented financial management system incorporating the method and apparatus for goal orientated financial management using projected balances disclosed herein becomes a virtual financial planning partner for the user.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "creating", "obtaining", "defining", "storing", "implementing", "notifying", etc., refer to the action and processes of a computing system or similar electronic device that manipulates and operates on data represented as physical (electronic) quantities within the computing system memories, resisters, caches or other information storage, transmission or display devices, available at the time of filing or as later developed.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems, available at the time of filing or as later developed.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device, available at the time of filing or as later developed.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope set forth in the claims below.

In addition, the operations shown in the FIG.s are identified using a particular nomenclature for ease of description and understanding, but other nomenclature is often used in the art to identify equivalent operations.

In addition, the order of operations depicted in the FIG.s and discussed above was chosen for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for goal orientated financial management using projected balances comprising:

providing, through execution on a computing system including a processor and memory coupled to the processor, the memory having processor executable instructions stored therein to perform a process for goal orientated financial management using projected balances, a computing system implemented financial management system, the computing system implemented financial management system including a projected balance feature, the projected balance feature being used to predict future balances of one or more selected accounts associated with computing system implemented financial management system using historical financial data or recurring financial activities associated with the one or more selected accounts, the computing system being configured to create automatic payments rules to support goals;

selecting, through the computing system, a financial account from the one or more associated financial accounts;

defining, through the computing system, a financial goal; and creating, by the computing system, at least one automatic payment rule for performing financial transactions through the selected account, the at least one automatic payment rule being created to support the defined financial goal, wherein the at least one automatic payment rule is created and implemented based on projected account data generated by the computing system implemented financial management system projected balance feature.

2. The computing system implemented process for goal orientated financial management using projected balances of claim 1,
wherein the at least one automatic payment rule is created and manually implemented based on projected account data from the computing system implemented financial management system projected balance feature.

3. The computing system implemented process for goal orientated financial management using projected balances of claim 1,
wherein the at least one automatic payment rule is created and automatically implemented based on projected account data from the computing system implemented financial management system projected balance feature.

4. The computing system implemented process for goal orientated financial management using projected balances of claim 1,
wherein the at least one automatic payment rule is created and semi-automatically implemented based on projected account data from the computing system implemented financial management system projected balance feature.

5. The computing system implemented process for goal orientated financial management using projected balances of claim 1,
wherein the defined financial goal is related to maintaining a defined minimum balance in the selected account.

6. The computing system implemented process for goal orientated financial management using projected balances of claim 5,
wherein creating, through the computing system, at least one automatic payment rule for performing financial transactions using the selected account comprises creating, through the computing system, an automatic payment rule whereby the payment of one or more bills from the selected account is delayed until after a date determined by the projected balance feature, the date being determined by the projected balance feature based on a predicted deposit being made to ensure the defined minimum balance is maintained.

7. The computing system implemented process for goal orientated financial management using projected balances of claim 1,
wherein the defined financial goal is related to maximizing an average balance in the selected account over a defined time period.

8. The computing system implemented process for goal orientated financial management using projected balances of claim 7,
wherein creating, through the computing system, at least one automatic payment rule for performing financial transactions using the selected account comprises creating, through the computing system, an automatic payment rule whereby the payment of one or more bills from the selected account is delayed until after a date determined by the projected balance feature, the date being determined by the projected balance feature based on a predicted deposit being made to maximize the average balance in the selected account over the defined time period.

9. The computing system implemented process for goal orientated financial management using projected balances of claim 1,
wherein the defined financial goal is related to paying defined high priority bills from the selected account before paying defined lower priority bills from the selected account.

10. The computing system implemented process for goal orientated financial management using projected balances of claim 9,
wherein creating, through the computing system, at least one automatic payment rule for performing financial transactions using the selected account comprises creating, through the computing system, an automatic payment rule whereby the payment of one or more defined lower priority bills from the selected account is delayed until after a date determined by the projected balance feature, the date being determined by the projected balance feature based on payments to the defined high priority accounts being processed.

11. The computing system implemented process for goal orientated financial management using projected balances of claim 1,
wherein the defined financial goal is related to funding one or more user savings programs.

12. The computing system implemented process for goal orientated financial management using projected balances of claim 11,
wherein creating, through the computing system, at least one automatic payment rule for performing financial transactions using the selected account comprises creating, through the computing system, an automatic payment rule whereby uncommitted funds for a defined period of time are calculated by the projected balance feature and those funds are transferred to the one or more user savings programs in a prioritized order.

13. The computing system implemented process for goal orientated financial management using projected balances of claim 1,
wherein the defined financial goal is related to minimizing interest paid on credit accounts.

14. The computing system implemented process for goal orientated financial management using projected balances of claim 13,
wherein creating, through the computing system, at least one automatic payment rule for performing financial transactions using the selected account comprises creating, through the computing system, an automatic payment rule whereby uncommitted funds for a defined period of time are calculated by the projected balance feature and those funds are directed to one or more defined high interest credit accounts.

15. A system for goal orientated financial management using projected balances comprising:
a computing processor; and
a memory coupled to the processor, the memory having stored therein processor executable instructions for executing a process for goal oriented financial management using projected balances, the process for goal oriented financial management using projected balances comprising:
providing a computing system implemented financial management system having a projected balance feature;
interfacing with the computing system implemented financial management system and projected balance feature, the computing system implemented financial management system having one or more associated financial accounts;
selecting a financial account from the one or more associated financial accounts;
defining a financial goal; and
creating, automatically by the process for goal oriented financial management using projected balances at least one automatic payment rule for performing financial transactions through the selected account, the at least one automatic payment rule being created to support the defined financial goal, wherein the at least one automatic payment rule is created and implemented based on projected account data provided from the computing system implemented financial management system projected balance feature.

16. The system for goal orientated financial management using projected balances of claim 15, wherein the at least one automatic payment rule is created and manually implemented based on projected account data from the computing system implemented financial management system projected balance feature.

17. The system for goal orientated financial management using projected balances of claim 15, wherein the at least one automatic payment rule is created and automatically implemented based on projected account data from the computing system implemented financial management system projected balance feature.

18. The system for goal orientated financial management using projected balances of claim 15, wherein the at least one automatic payment rule is created and semi-automatically implemented based on projected account data from the computing system implemented financial management system projected balance feature.

19. The system for goal orientated financial management using projected balances of claim 15, wherein the defined financial goal is related to maintaining a defined minimum balance in the selected account.

20. The system for goal orientated financial management using projected balances of claim 19, wherein creating at least one automatic payment rule for performing financial transactions using the selected account comprises creating an automatic payment rule whereby the payment of one or more bills from the selected account is delayed until after a date determined by the projected balance feature, the date being determined by the projected balance feature based on a predicted deposit being made to ensure the defined minimum balance is maintained.

21. The system for goal orientated financial management using projected balances of claim 15, wherein the defined financial goal is related to maximizing an average balance in the selected account over a defined time period.

22. The system for goal orientated financial management using projected balances of claim 21, wherein creating at least one automatic payment rule for performing financial transactions using the selected account comprises creating an automatic payment rule whereby the payment of one or more bills from the selected account is delayed until after a date determined by the projected balance feature, the date being determined by the projected balance feature based on a predicted deposit being made to maximize the average balance in the selected account over the defined time period.

23. The system for goal orientated financial management using projected balances of claim 15, wherein the defined financial goal is related to paying defined high priority bills from the selected account before paying defined lower priority bills from the selected account.

24. The system for goal orientated financial management using projected balances of claim 23, wherein creating at least one automatic payment rule for performing financial transactions using the selected account comprises creating an automatic payment rule whereby the payment of one or more defined lower priority bills from the selected account is delayed until after a date determined by the projected balance feature, the date being determined by the projected balance feature based on payments to the defined high priority accounts being processed.

25. The system for goal orientated financial management using projected balances of claim 15, wherein the defined financial goal is related to funding one or more user savings programs.

26. The system for goal orientated financial management using projected balances of claim 25, wherein creating at least one automatic payment rule for performing financial transactions using the selected account comprises creating an automatic payment rule whereby uncommitted funds for a defined period of time are calculated by the projected balance feature and those funds are transferred to the one or more user savings programs in a prioritized order.

27. The system for goal orientated financial management using projected balances of claim 15, wherein the defined financial goal is related to minimizing interest paid on credit accounts.

28. The system for goal orientated financial management using projected balances of claim 27, wherein creating at least one automatic payment rule for performing financial transactions using the selected account comprises creating an automatic payment rule whereby uncommitted funds for a defined period of time are calculated by the projected balance feature and those funds are directed to one or more defined high interest credit accounts.

29. A computer program product for goal oriented financial management using projected balances comprising:

a non-transitory computer readable medium; and, computer program code, encoded on the computer readable medium, comprising computer readable instructions which when executed by a computing processor, perform a process for goal oriented financial management using projected balances comprising:

interfacing with a computing system implemented financial management system, the computing system implemented financial management system including a projected balance feature, the projected balance feature being used to predict future balances of one or more selected accounts associated with computing system implemented financial management system using historical financial data or recurring financial activities associated with the one or more selected accounts;

selecting a financial account from the one or more associated financial accounts; defining a financial goal; and creating, automatically by the process for goal oriented financial management using projected balances at least one automatic payment rule for performing financial transactions through the selected account, the at least one automatic payment rule being created to support the defined financial goal;

wherein the at least one automatic payment rule is created and implemented based on projected account data provided from the computing system implemented financial management system projected balance feature.

30. The computer program product for goal orientated financial management using projected balances of claim 29, wherein the at least one automatic payment rule is created and manually implemented based on projected account data from the computing system implemented financial management system projected balance feature.

31. The computer program product for goal orientated financial management using projected balances of claim 29, wherein the at least one automatic payment rule is created and automatically implemented based on projected account data from the computing system implemented financial management system projected balance feature.

32. The computer program product for goal orientated financial management using projected balances of claim 29, wherein the at least one automatic payment rule is created and semi-automatically implemented based on projected account data from the computing system implemented financial management system projected balance feature.

33. The computer program product for goal orientated financial management using projected balances of claim 29, wherein the defined financial goal is related to maintaining a defined minimum balance in the selected account.

34. The computer program product for goal orientated financial management using projected balances of claim 33, wherein creating at least one automatic payment rule for performing financial transactions using the selected account comprises creating an automatic payment rule whereby the payment of one or more bills from the selected account is delayed until after a date determined by the projected balance feature, the date being determined by the projected balance feature based on a predicted deposit being made to ensure the defined minimum balance is maintained.

35. The computer program product for goal orientated financial management using projected balances of claim 29, wherein the defined financial goal is related to maximizing an average balance in the selected account over a defined time period.

36. The computer program product for goal orientated financial management using projected balances of claim 35, wherein creating at least one automatic payment rule for performing financial transactions using the selected account comprises creating an automatic payment rule whereby the payment of one or more bills from the selected account is delayed until after a date determined by the projected balance feature, the date being determined by the projected balance feature based on a predicted deposit being made to maximize the average balance in the selected account over the defined time period.

37. The computer program product for goal orientated financial management using projected balances of claim 29, wherein the defined financial goal is related to paying defined high priority bills from the selected account before paying defined lower priority bills from the selected account.

38. The computer program product for goal orientated financial management using projected balances of claim 37, wherein creating at least one automatic payment rule for performing financial transactions using the selected account comprises creating an automatic payment rule whereby the payment of one or more defined lower priority bills from the selected account is delayed until after a date determined by the projected balance feature, the date being determined by the projected balance feature based on payments to the defined high priority accounts being processed.

39. The computer program product for goal orientated financial management using projected balances of claim 29, wherein the defined financial goal is related to funding one or more user savings programs.

40. The computer program product for goal orientated financial management using projected balances of claim 39, wherein creating at least one automatic payment rule for performing financial transactions using the selected account comprises creating an automatic payment rule whereby uncommitted funds for a defined period of time are calculated by the projected balance feature and those funds are transferred to the one or more user savings programs in a prioritized order.

41. The computer program product for goal orientated financial management using projected balances of claim 29, wherein the defined financial goal is related to minimizing interest paid on credit accounts.

42. The computer program product for goal orientated financial management using projected balances of claim 41, wherein creating at least one automatic payment rule for performing financial transactions using the selected account comprises creating an automatic payment rule whereby uncommitted funds for a defined period of time are calculated by the projected balance feature and those funds are directed to one or more defined high interest credit accounts.

43. A system for goal oriented financial management using projected balances comprising:
   a computing system;
   a computing system implemented financial management system, the computing system implemented financial management system including a projected balance feature, the projected balance feature being used to predict future balances of one or more selected accounts associated with computing system implemented financial management system using historical financial data or recurring financial activities associated with the one or more selected accounts; and
   a computing processor coupled to a memory, the memory having processor executable instructions stored therein for a process for goal oriented financial management using projected balances, the processor for executing the process for goal oriented financial management using projected balances, the process for goal oriented financial management using projected balances comprising:
   interfacing with the computing system implemented financial management system and projected balance feature, the computing system implemented financial management system having one or more associated financial accounts;
   selecting a financial account from the one or more associated financial accounts; defining at least two different financial goals;
   selecting a level of automation for the system, wherein a high level of automation configures the system to create automatic payment rules and make payments supporting the defined goals without requiring further user input, and where a low level of automation configures the system so that the user must approve each payment before the payment is sent, and where an intermediate level of automation configures the system to require user approval for payments either falling outside predefined first criteria or alternatively meeting certain predefined second criteria, the system being capable of considering criteria comprising payment amount and the timeframe of the payment;

creating at least one different automatic payment rule for each of the individual ones of the two financial goals, the automatic payment rules being created and implemented based on projected account data generated by the computing system implemented financial management system projected balance feature;

the system being configured to create automatic payments rules to support goals, the goals including minimizing interest paid out by the user, maximizing interest paid in to the user, maximizing the average balance in a selected high interest bearing account, and maintaining a minimum balance in a selected account;

the system being further configured to create rules including paying specific bills on specific dates based on data obtained from the projected balance feature, making a first payment on a first credit account to satisfy the minimum payment by the due date and making a second payment against the first credit account after a known recurring deposit is due to have been made into the selected financial account;

wherein, if there is a conflict between the automatic payment rules supporting the two different financial goals the user is requested to approve one or more of those automatic payment rules prior to payments under the one or more conflicting automatic payment rules being made.

* * * * *